(12) United States Patent
Kim et al.

(10) Patent No.: US 9,970,426 B2
(45) Date of Patent: May 15, 2018

(54) APPARATUS AND METHOD FOR CONTROLLING A LINEAR COMPRESSOR

(71) Applicant: LG ELECTRONICS INC., Seoul (KR)

(72) Inventors: Gyunam Kim, Seoul (KR); Kyunghoon Jung, Seoul (KR); Jaeyoo Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 14/867,337

(22) Filed: Sep. 28, 2015

(65) Prior Publication Data

US 2016/0090975 A1    Mar. 31, 2016

(30) Foreign Application Priority Data

Sep. 29, 2014   (KR) ........................ 10-2014-0130430

(51) Int. Cl.
*F04B 49/06* (2006.01)
*F04B 51/00* (2006.01)
(Continued)

(52) U.S. Cl.
CPC ............ *F04B 35/04* (2013.01); *F04B 35/045* (2013.01); *F04B 49/06* (2013.01); *F04B 49/065* (2013.01); *F04B 51/00* (2013.01); *H02P 25/06* (2013.01); *F04B 2203/0401* (2013.01); *F04B 2203/0402* (2013.01)

(58) Field of Classification Search
USPC ........................................ 318/135, 686, 687
See application file for complete search history.

(56) References Cited

U.S. PATENT DOCUMENTS

| 6,176,683 | B1 | 1/2001 | Yang |
| 6,758,051 | B2 * | 7/2004 | Jayanth ................ B25J 9/1687 |
| | | | 361/22 |

(Continued)

FOREIGN PATENT DOCUMENTS

| CN | 1356471 | 7/2002 |
| CN | 1356472 | 7/2002 |

(Continued)

OTHER PUBLICATIONS

Chinese Office Action dated Sep. 29, 2016 issued in Application No. 201510631314.6 (with English translation).
European Search Report dated Mar. 2, 2016.

*Primary Examiner* — Bentsu Ro
(74) *Attorney, Agent, or Firm* — KED & Associates, LLP (57) ABSTRACT

An apparatus and method for controlling a linear compressor are provided. The apparatus and method may identify a kind of motor of a linear compressor, based on an output which may be measured by applying a test signal to the linear compressor, and may control the linear compressor depending on the identified kind of motor. The apparatus and method may diagnose whether the linear compressor has broken down, and thus, the kind of motor may be autonomously identified without a separate device or a measurement operation, control suitable for a characteristic or characteristics of the motor may be accurately and efficiently controlled, and maintenance, repair, and inspection of the linear compressor may be simply and easily performed.

17 Claims, 5 Drawing Sheets

(51) Int. Cl.
F04B 35/04 (2006.01)
H02P 25/06 (2016.01)

(56) References Cited

U.S. PATENT DOCUMENTS

| | | | | |
|---|---|---|---|---|
| 7,290,989 | B2 * | 11/2007 | Jayanth | F04C 23/008 417/44.1 |
| 7,392,158 | B2 * | 6/2008 | Hikawa | F04B 49/065 318/490 |
| 2002/0064463 | A1 | 5/2002 | Park et al. | |
| 2004/0071556 | A1 | 4/2004 | Sung et al. | |
| 2006/0127225 | A1 | 6/2006 | Kim et al. | |

FOREIGN PATENT DOCUMENTS

| CN | 1878958 | 12/2006 |
|---|---|---|
| CN | 102193065 | 9/2011 |
| CN | 103343743 | 10/2013 |

* cited by examiner

APPARATUS AND METHOD FOR CONTROLLING A LINEAR COMPRESSOR

CROSS-REFERENCE TO RELATED APPLICATION(S)

Pursuant to 35 U.S.C. § 119(a), this application claims priority to Korean Application No. 10-2014-0130430, filed in Korea on Sep. 29, 2014, the contents of which is incorporated by reference herein in its entirety.

BACKGROUND

1. Field

An apparatus and method for controlling a linear compressor are disclosed herein.

2. Background

Generally, compressors are devices that converts mechanical energy into compression energy of a compressible fluid. A compressor may be used as a part of a freezing device, for example, a refrigerator, or an air conditioner.

The compressors are categorized into reciprocating compressors, rotary compressors, and scroll compressors. In the reciprocating compressors, a compression space, into and from which an operating gas, such as a refrigerant, is sucked and discharged, is provided between a piston and a cylinder, and the piston performs a rectilinear reciprocating motion in the cylinder to compress the refrigerant. In the rotary compressors, a compression space, into and from which an operating gas, such as a refrigerant, is sucked and discharged, is provided between a cylinder and a roller that eccentrically rotates, and the roller eccentrically rotates along an inner wall of the cylinder to compress the refrigerant. In the scroll compressors, a compression space, into and from which an operating gas, such as a refrigerant, is sucked and discharged, is provided between an orbiting scroll and a fixed scroll, and the orbiting scroll rotates along the fixed scroll to compress the refrigerant.

The reciprocating compressors linearly reciprocate the piston in the cylinder to suck, compress, and discharge a refrigerant gas. The reciprocating compressors are categorized into a reciprocating method and a linear method depending on a method of driving the piston.

The reciprocating method is a method that couples a crankshaft to a motor which is rotated and couples a piston to the crankshaft, thereby converting a rotating motion of the motor into a rectilinear reciprocating motion. On the other hand, the linear method is a method that couples a piston to a movable element of a motor performing a rectilinear motion to reciprocate the piston using the rectilinear motion of the motor.

The reciprocating compressors each include an electric unit or device, which generates a drive force, and a compression unit or device that receives the drive force from the electric device to compress a fluid. A motor is generally used as the electric device. In the linear method, a linear motor is used as the electric device.

As the linear motor directly generates a rectilinear drive force, the linear motor does not need a mechanical conversion device, and a structure of the linear motor is not complicated. Also, the linear motor reduces the incidence of loss caused by energy conversion, and as the linear motor does not include a connection part that causes friction and abrasion, the linear motor generates less noise in comparison to other motors. Further, when a linear reciprocating compressor (hereinafter referred to as a "linear compressor") is applied to a refrigerator or an air conditioner, a compression ratio is changed by changing a stroke voltage applied to the linear compressor, and thus, the linear compressor may be applied to variable control of a freezing capacity.

In the reciprocating compressors, in particular, the linear compressors, the piston performs a reciprocating motion in a state in which the piston is not mechanically restrained in the cylinder, and thus, when an excessive voltage is suddenly applied to the linear compressor, the piston is dashed against a wall of the cylinder, or compression cannot be normally performed because the piston cannot travel due to a large load. Therefore, a control device for controlling a motion of the piston when a load or a voltage is changed is essential.

Generally, a compressor control device detects a voltage and a current applied to a compressor motor and estimates a stroke to perform feedback control using a sensorless method. In this case, the compressor control device includes a triac or an inverter as a means for controlling a compressor.

In the compressor control device, control based on a compressor motor should be performed. In the related art, the compressor control device performs control using a method that measures a motor constant for each model of motor to directly input the measured motor constant to a control program, and detects a voltage and a current to estimate a stroke using the sensorless method, thereby performing feedback control.

However, such a method undergoes an inconvenient process of previously measuring a motor constant to directly input the measured motor constant to a control program. Also, when a control target of a control device is changed due to repair, inspection, or breakdown, a compressor is controlled by repeating the inconvenient process.

Alternatively, control is performed using a method in which a control program defined for each model of motor is built into a device. However, using the defined control program, a kind of controllable motor is limited, and whenever a control target is changed, the control program is changed. Also, a number of control programs should be built into a device so as to control various kinds of motors, and for this reason, compatibility of a control device is largely limited.

BRIEF DESCRIPTION OF THE DRAWINGS

Embodiments will be described in detail with reference to the following drawings in which like reference numerals refer to like elements, and wherein.

DETAILED DESCRIPTION

Embodiments disclosed herein may be applied to an apparatus and method for controlling a linear compressor. However, the embodiments disclosed are not limited thereto and may be applied to all compressor control apparatuses, compressor control methods, motor control apparatuses, motor control methods, fault diagnosis apparatuses, fault diagnosis methods, test apparatuses, and test methods to which the technical spirit may be applied. In particular, embodiments disclosed herein may be applied to an apparatus for controlling a linear compressor and a method for controlling a linear compressor, which control various kinds of linear compressors.

The terminology used herein is for the purpose of describing particular embodiments only and is not intended to be limiting. Unless otherwise defined, all terms used herein have the same meaning as commonly understood by one of ordinary skill in the art to which the embodiments pertain, and should not be interpreted as having an excessively comprehensive meaning nor as having an excessively contracted meaning. If technical terms used herein are erroneous or fails to accurately express the technical idea, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

In describing embodiments, if a detailed explanation for a related known function or construction is considered to unnecessarily divert the gist, such explanation has been omitted but would be understood by those skilled in the art. The accompanying drawings aim to facilitate understanding and should not be construed as limited to the accompanying drawings.

Hereinafter, an apparatus for controlling a linear compressor and a method for controlling a linear compressor, according to embodiments, will be described with reference to FIGS. 1 to 8.

Figure 1:
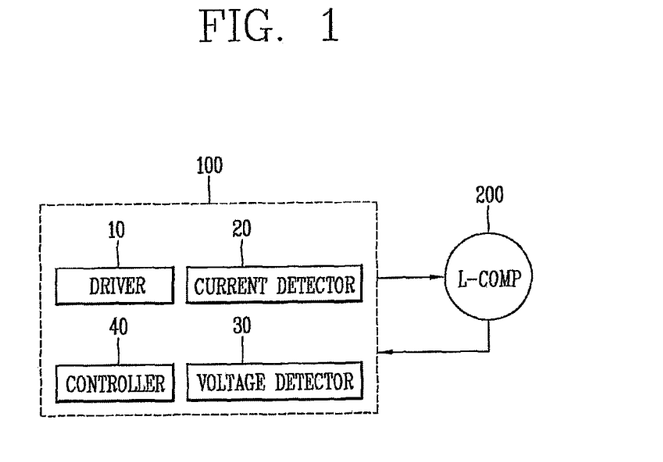
FIG. 1 is a block diagram of an apparatus for controlling a linear compressor according to an embodiment.
Figure 2:
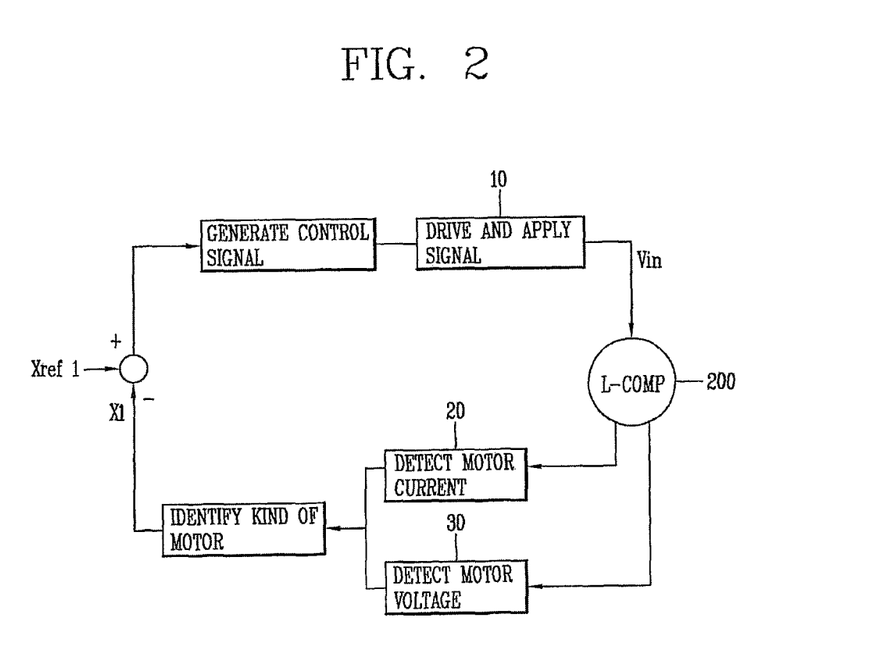
FIG. 2 is a block diagram illustrating a control operation of an apparatus for controlling a linear compressor according to an embodiment.
Figure 3:
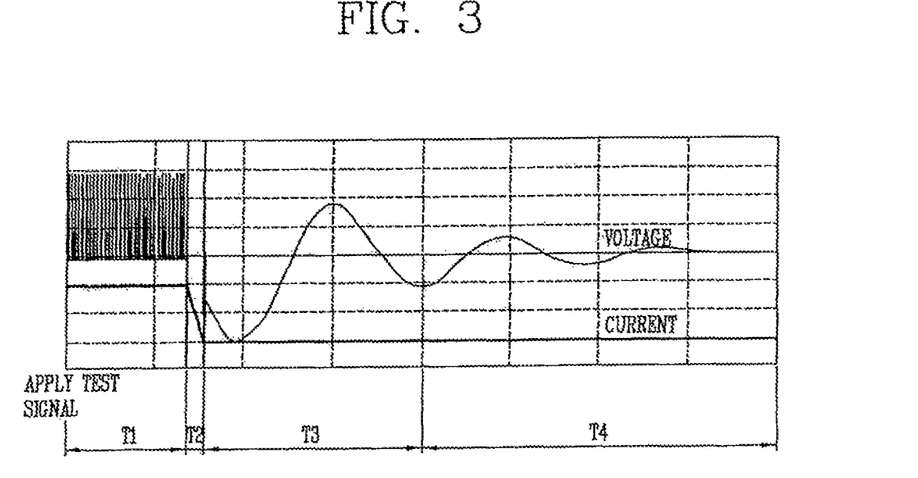
FIG. 3 is a waveform diagram showing waveforms and changes in motor current and motor voltage of an apparatus for controlling a linear compressor according to an embodiment.
Figure 4:
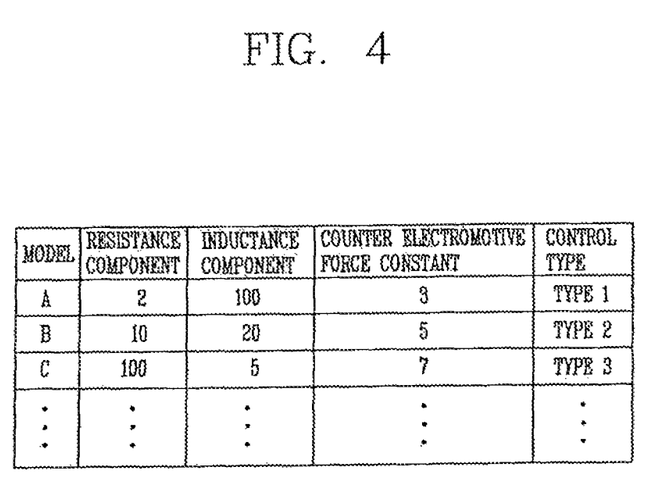
FIG. 4 is an exemplary diagram illustrating a predetermined criterion of an apparatus for controlling a linear compressor according to an embodiment.
Figure 5:
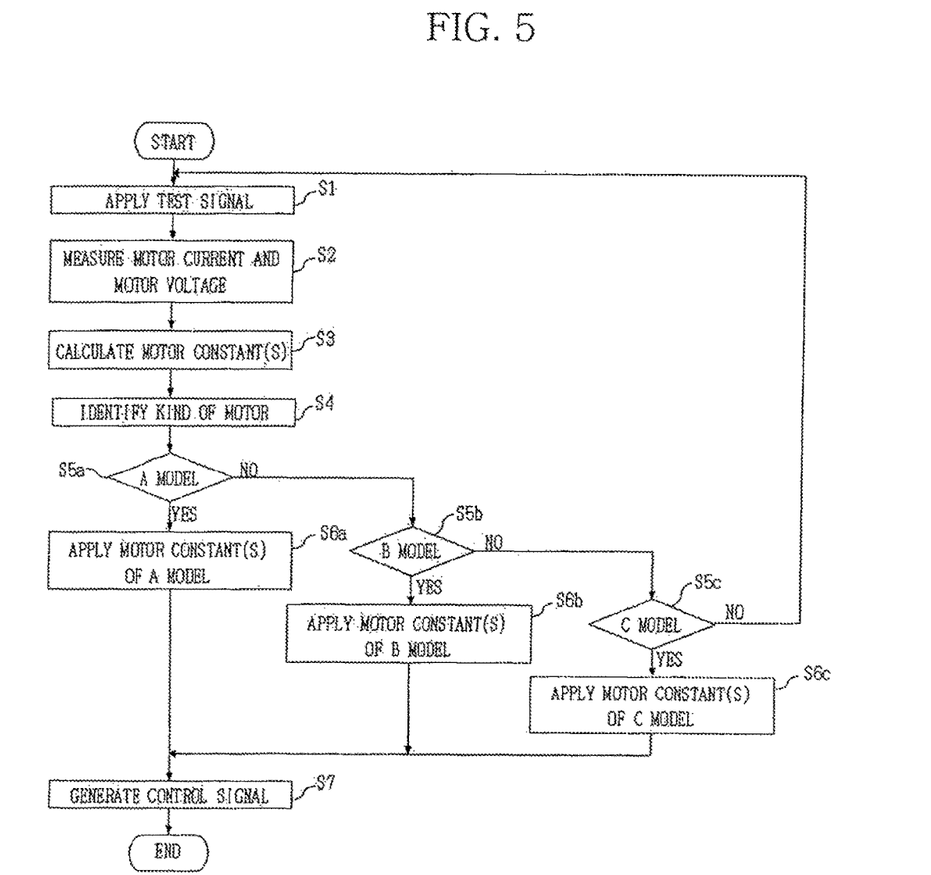
FIG. 5 is a flowchart of a control operation of an apparatus for controlling a linear compressor according to an embodiment.
Figure 6:
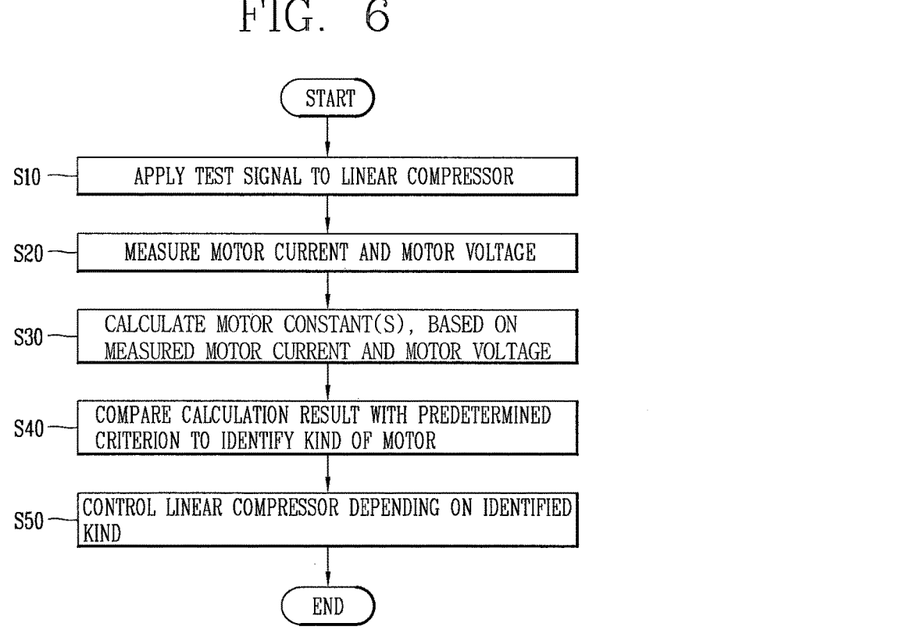
FIG. 6 is a flowchart of a method for controlling a linear compressor according to an embodiment.
Figure 7:
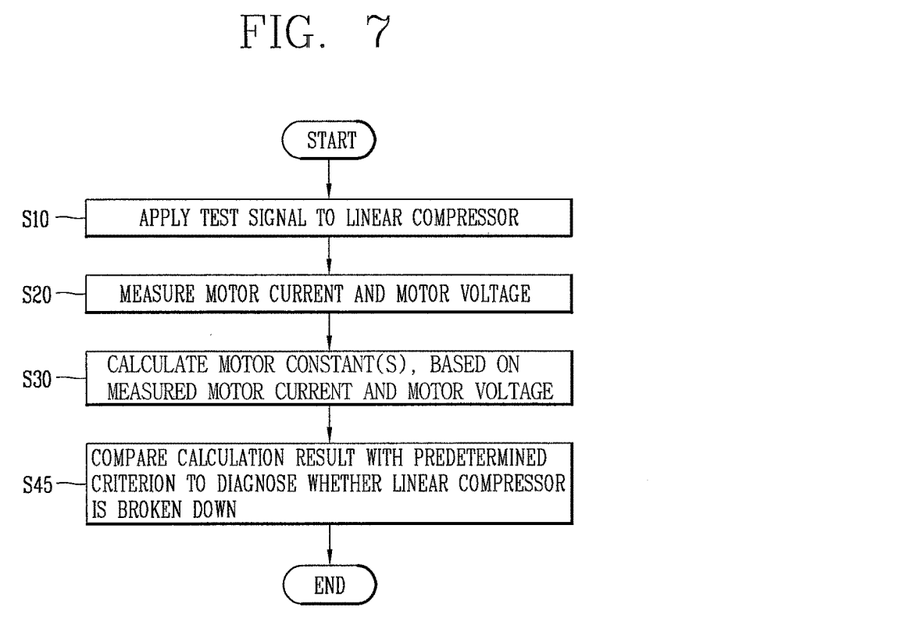
FIG. 7 is a flowchart of a method for controlling a linear compressor according to an embodiment.
Figure 8:
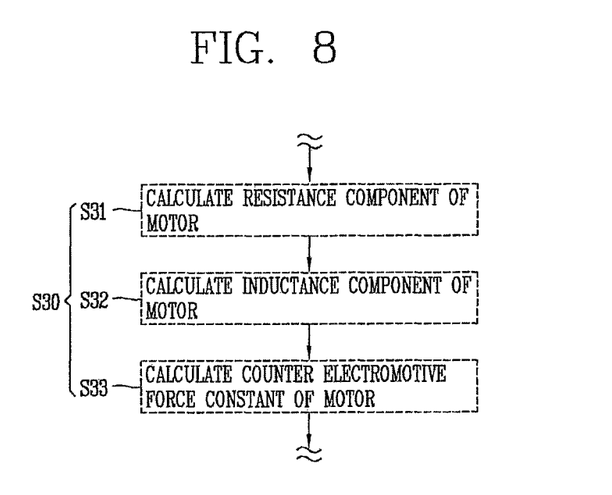
FIG. 8 is a flowchart of a method for controlling a linear compressor according to an embodiment.

FIG. 1 is a block diagram of an apparatus for controlling a linear compressor according to an embodiment. FIG. 2 is a block diagram illustrating a control operation of an apparatus for controlling a linear compressor according to an embodiment. FIG. 3 is a waveform diagram showing waveforms and changes in motor current and motor voltage of an apparatus for controlling a linear compressor according to an embodiment. FIG. 4 is an exemplary diagram illustrating a predetermined criterion of an apparatus for controlling a linear compressor according to an embodiment. FIG. 5 is a flowchart of a control operation of an apparatus for controlling a linear compressor according to an embodiment. FIG. 6 is a flowchart of a method for controlling a linear compressor according to an embodiment. FIG. 7 is a flowchart of a method for controlling a linear compressor according to an embodiment. FIG. 8 is a flowchart of a method for controlling a linear compressor according to an embodiment.

First, an apparatus (hereinafter referred to as a "control apparatus") 100 for controlling a linear compressor according to an embodiment will be described with reference to FIGS. 1 to 5. The control apparatus 100 may include components as illustrated in FIG. 1. As illustrated in FIG. 1, the control apparatus 100 may include a driver 10 that drives a linear compressor 200, the linear compressor 200 including a motor, based on a control signal, a current detector 20 that detects a motor current of the linear compressor 200, a voltage detector 30 that detects a motor voltage of the linear compressor 200, and a controller 40 that generates the control signal, based on the motor current and the motor voltage.

A control operation of the control apparatus 100 may be performed as illustrated in FIG. 2. The driver 10 may apply a signal to the linear compressor 200 to drive the linear compressor 200. The current detector 20 may detect the motor current of the linear compressor 200, and the voltage detector 30 may detect the motor voltage of the linear compressor 200. The controller 40 may identify a kind of motor of the linear compressor 200, based on the motor current and the motor voltage and may generate the control signal for controlling the linear compressor 200. The driver 10 may apply the control signal generated by the controller 40 to the linear compressor 200 to control the linear compressor 200.

The control apparatus 100 may include the driver 10, the current detector 20, the voltage detector 30, and the controller 40. The controller 40 may apply a test signal to the linear compressor 200 and may identify the kind of motor, based on the motor current and the motor voltage, which may be measured according to the test signal. The test signal may include different kinds of signals, which may be differently supplied in units of two or more time sections.

That is, the control apparatus 100 may identify the kind of motor of the linear compressor 200 using the test signal, to control the linear compressor 200. The test signal may be a test dedicated signal, which may be applied to the linear compressor 200 for identifying the kind of motor. The test signal may be one of a direct current (DC) voltage or a high frequency voltage.

When the test signal is applied to the linear compressor 200, the motor current and the motor voltage based on the test signal may be output, and thus, the current detector 20 may detect the motor current, and the voltage detector 30 may detect the motor voltage. The test signal may be one of the DC voltage or the high frequency voltage, and may include the different kinds of signals, which may be differently supplied in units of the two or more time sections. The motor current and the motor voltage may be output as the different kinds of signals in units of the two or more time sections.

For example, the test signal may be applied as a signal from a signal applying time to a first timing, and the applied signal may disappear from the first timing to a second timing. Therefore, the motor current and the motor voltage, which may be output from the signal applying time to the first timing may differ from the motor current and the motor voltage, which may be output from the first timing to the second timing, based on the test signal.

A concept, where each of the motor current and the motor voltage is differently output in units of the two or more time sections, is illustrated in FIG. 3. Waveforms shown in FIG. 3 may be output waveforms of the motor current and the motor voltage when the DC voltage or the high frequency voltage is applied to the linear compressor 200.

As shown in FIG. 3, the two or more time sections may be divided into a first section T1, which starts immediately when the test signal is applied to the linear compressor 200, a second section T2, which is a transition section until before the test signal disappears after the test signal is applied to the linear compressor 200, and a third section T3 subsequent to the second section T2. That is, as the test signal is applied as different signals in units of the two or more time sections, each of the motor current and the motor voltage may be differently output in the first section T1, the second section T2, and the third section T3.

The controller 40 may calculate a motor constant or motor constants of the motor, based on the motor current and the motor voltage, which may be measured in units of the two or more time sections. The motor constant(s) may include a resistance component of the motor, an inductance component of the motor, and/or a counter electromotive force constant of the motor.

The motor constant(s) may be a constant or constants representing a characteristic or characteristics of the motor. That is, the motor constant(s) may be given as different values depending on the kind of motor. That is, the controller 40 may calculate the motor constant(s) and may check the kind of motor corresponding to the calculated motor constant(s) to identify the kind of motor.

The resistance component may be a constant representing a resistance characteristic of the motor. The inductance component may be a constant representing an inductance characteristic of the motor. The counter electromotive force constant may be a constant representing a counter electromotive force characteristic of the motor.

The controller 40 may calculate the motor constant(s) as expressed in the following Equation (1):

$$V = Ri + L\frac{di}{dt} + \alpha \frac{dx}{dt} \tag{1}$$

where Equation (1) is an electric equation representing an electric characteristic of the motor, and V denotes motor voltage, R denotes resistance component, i denotes motor current, L denotes an inductance component, di/dt denotes a time differentiation of the motor current, α denotes an counter electromotive force constant, and dx/dt denotes a stroke time differentiation of the motor. The resistance component "R", the inductance component "L", and the counter electromotive force constant "α" may be calculated by substituting the measured motor current and motor voltage into Equation (1).

The first section T1 may be a section during which the motor current is output as a certain DC current as shown in FIG. 3. In the first section T1, the controller 40 may calculate the resistance component of the motor, based on an output of the motor current in the first section T1.

The controller 40 may substitute outputs of the motor current and the motor voltage, corresponding to the first section T1, into Equation (1) to calculate the resistance component as expressed in the following Equation (2):

$$V = Ri + L \cancel{\frac{di^0}{dt}} + \alpha \cancel{\frac{dx^0}{dt}} \tag{2}$$

The motor current and the motor voltage corresponding to the first section T1 may be output as DC signals, and the time differentiation of the motor current and the stroke time differentiation of the motor may each be 0. Therefore, the resistance component may be calculated by performing an arithmetic operation expressed as Equation (2).

The resistance component may be expressed as the following Equation (3):

$$R = \frac{V}{i} \tag{3}$$

That is, the resistance component may be calculated based on the motor current and the motor voltage corresponding to the first section T1.

The second section T2 may be a transition section during which the motor current is changed from a certain DC current to 0 A, as shown in FIG. 3. In the second section T2, the controller 40 may calculate the inductance component of the motor, based on a change in the motor current in the second section T2.

The controller 40 may substitute outputs of the motor current and the motor voltage, corresponding to the second section T2, into Equation (1) to calculate the resistance component as expressed in the following Equation (4):

$$V = \cancel{Ri}^0 + L\frac{di}{dt} + \alpha \cancel{\frac{dx}{dt}}^0 \tag{4}$$

The motor current and the motor voltage corresponding to the second section T2 may be changed to and output as a value of 0, and the time differentiation of the motor current and the stroke time differentiation of the motor may each be 0. Therefore, the inductance component may be calculated by performing an arithmetic operation expressed as Equation (4).

The inductance component may be expressed as the following Equation (5):

$$L = V\frac{dt}{di} \tag{5}$$

That is, the inductance component may be calculated based on the motor current and the motor voltage corresponding to the second section T2.

The third section T3 may be a section during which the motor current is not output, as shown in FIG. 3. In the third section T3, the controller 40 may calculate the counter electromotive force constant of the motor, based on a non-output of the motor current in the third section T3.

The controller 40 may substitute outputs of the motor current and the motor voltage, corresponding to the third section T3, into Equation (1) to calculate the resistance component as expressed in the following Equation (6):

$$V = \cancel{Ri}^0 + L\cancel{\frac{di}{dt}}^0 + \alpha \frac{dx}{dt} \tag{6}$$

The motor current corresponding to the third section T3 may be output as 0 A, and the time differentiation of the motor current may not be performed. Therefore, the counter electromotive force constant may be calculated by performing an arithmetic operation expressed as Equation (6).

The counter electromotive force constant may be expressed as the following Equation (7):

$$\alpha = V \frac{dt}{dx} \quad (7)$$

That is, the controller 40 may calculate the counter electromotive force constant, based on the motor current and the motor voltage corresponding to the third section T3.

The controller 40 may compare a result of the calculation with predetermined criterion to identify the kind of motor. The predetermined criterion may be criterion for the motor constant(s), which may be differently set depending on the kind of motor. That is, the controller 40 may compare at least one of the calculated resistance component, the calculated inductance component, or the calculated counter electromotive force constant with the predetermined criterion, which may be differently set depending on the kind of motor, thereby identifying the kind of motor of the linear compressor 200.

The predetermined criterion may be set in the controller 40 in a table form shown in FIG. 4.

As an example of identifying the kind of motor with reference to FIG. 4, when the calculated resistance component is 2, the calculated resistance component may correspond to a resistance component of a model A included in the predetermined criterion, and thus, the controller 40 may identify the kind of motor as the model A. Alternatively, when the calculated inductance component is 20, the calculated inductance component may correspond to an inductance component of a model B included in the predetermined criterion, and thus, the controller 40 may identify the kind of motor as the model B.

The controller 40 may calculate at least one of the motor constants and may compare the calculated motor constant with the predetermined criterion. That is, the controller 40 may calculate only any one of the motor constants, calculate two or more of the motor constants, or calculate all of the motor constants, and may compare a result of the calculation with the predetermined criterion to identify the kind of motor.

Before the linear compressor 200 starts to normally operate, the controller 40 may apply the test signal to the linear compressor 200 to identify the kind of motor, and may generate the control signal for normal driving, based on the identified kind of motor. That is, as a model of the motor is identified before the linear compressor 200 starts to normally operate and the control signal is generated based on the identified model of the motor, control based on the model of the motor may be performed.

Referring again to FIG. 4, as an example of generating the control signal, when the calculated resistance component is 100 and the calculated inductance component is 5, the calculated resistance component and inductance component may respectively correspond to motor constants of a model C included in the predetermined criterion, and thus, the controller 40 may identify the kind of motor as the model C and may generate the control signal based on a type 3 so as to perform control corresponding to the type 3 based on the model C.

The control signal may be a signal for controlling driving of the linear compressor 200. For example, the control signal may be a signal for normal driving control of the linear compressor 200, stroke control of the motor, and/or output control of the motor, for example.

The control signal may be generated based on the motor constant(s). That is, in order for the characteristic or characteristics of the motor to be reflected, the controller 40 may generate the control signal, based on a motor constant or constants for an identified model. When the controller 40 generates the control signal according to the identified model and applies the control signal to the linear compressor 200, the linear compressor 200 may start to operate according to the control signal.

As the controller 40 generates the control signal according to the identified model, the control signal suitable for the characteristic or characteristics of the motor may be generated, and the linear compressor 200 may start to operate according to the control signal, which is generated based on the identified model, leading to driving suitable for the characteristic or characteristics of the motor.

The above-described control process performed by the control apparatus 100 may include operations illustrated in FIG. 5.

As illustrated in FIG. 5, the control apparatus 100 may apply the test signal to the linear compressor 200, in operation S1, and may detect and measure the motor current and the motor voltage based on the test signal, in operation S2. The control apparatus 100 may calculate a motor constant or constants of the motor, based on the measured motor current and motor voltage, in operation S3, and may compare a result of the calculation with the predetermined criterion to identify the kind of motor, in operation S4. The control apparatus 100 may apply the motor constant(s) corresponding to an identified kind (a model) of motor, in operations S5a-S5c, S6a-S6c and generate the control signal, in operation S7, and may finally control the linear compressor 200 depending on the identified kind (the model) of motor.

The controller 40 may include a memory that stores the motor constant(s). The memory may be a memory that stores pieces of data obtained through processing by the controller 40.

The memory may store a motor constant or constants of a motor which is operating. The motor constant(s) of the motor which is operating may be a motor constant or constants, which may be previously calculated by the controller 40, or a motor constant or constants, which may be input and set before the linear compressor 200 starts to operate and stored in the memory.

The controller 40 may apply the test signal to the linear compressor 200 to calculate the motor constant(s), may compare a result of the calculation with the motor constant(s) stored in the memory to determine whether the calculation result matches the stored motor constant(s), and may diagnose whether the linear compressor 200 has broken down, based on a result of the determination. The stored motor constant(s) may be a motor constant or constants of an operating motor, which may be previously calculated, or may be a motor constant or constants, which may be input, set, and stored. The controller 40 may determine whether a calculated motor constant(s) matches the stored motor constant(s), and may diagnose whether the operating motor has broken down, based on a result of the determination.

When the calculated motor constant(s) does not match the stored motor constant(s), the controller 40 may diagnose the motor as being abnormal. That is, when the motor does not normally operate due to an error that occurs in the motor, the characteristic or characteristics of the motor may be changed, and for this reason, the motor constant(s) may be calculated as a value that does not match the stored motor constant(s). Therefore, when the calculated motor constant(s) does not match the stored motor constant(s), the controller 40 may diagnose the motor as being abnormal.

When the calculated motor constant(s) matches the stored motor constant(s), the controller 40 may diagnose the motor as being normal. That is, when the motor normally operate because an error does not occur in the motor, the characteristic or characteristics of the motor may not be changed, and thus, the motor constant(s) may be calculated as a value that matches the stored motor constant(s). Therefore, when the calculated motor constant(s) matches the stored motor constant(s), the controller 40 may diagnose the motor as being normal.

Hereinafter, a method (hereinafter referred to as a "control method") for controlling a linear compressor according to an embodiment will be described with reference to FIGS. 6 to 8.

The control method of FIGS. 6 to 8 may be a control method performed by the above-described control apparatus 100. The control method may be a control method applied to a motor control apparatus that controls a motor. Further, the control method may be a control method applied to a control apparatus that controls a linear compressor including a motor.

Furthermore, the control method may be a control method (a control method 1) for identifying a kind of a motor of a linear compressor to control the linear compressor, or may be a control method (a control method 2) for identifying a kind of a motor of a linear compressor to diagnose whether the linear compressor has broken down. The control method 1 may be performed in a sequence illustrated in FIG. 6, and the control method 2 may be performed in a sequence illustrated in FIG. 7.

The control method 1 illustrated in FIG. 6 may be a control method for identifying the kind of motor of the linear compressor to control the linear compressor. The control method 1, as illustrated in FIG. 6, may include applying a test signal to a linear compressor, in operation S10, measuring a motor current and a motor voltage based on the test signal, in operation S20, calculating a motor constant or constants of a motor, based on the measured motor current and motor voltage, in operation S30, comparing a result of the calculation with a predetermined criterion to identify the kind of motor, in operation S40 and controlling the linear compressor depending on the identified kind of motor, in operation S50. The test signal may include different kinds of signals, which may be differently supplied in units of two or more time sections.

The test signal may be a test dedicated signal, which may be applied to the linear compressor for identifying the kind of motor of the linear compressor. The test signal may be one of a DC voltage or a high frequency voltage.

The two or more time sections may be divided into a first section, which starts immediately when the test signal is applied to the linear compressor, a second section, which is a transition section until before the test signal disappears after the test signal is applied to the linear compressor, and a third section subsequent to the second section. That is, as the test signal is applied as different signals in units of the two or more time sections, each of the motor current and the motor voltage may be differently output in the first section, the second section, and the third section.

The first section may be a section during which the motor current is output as a certain DC signal. The second section may be a transition section in which the motor current is changed from a certain DC current to 0 A. The third section may be a section during which the motor current is not output.

In operation S30, the motor constant or constants of the motor may be calculated based on the motor current and the motor voltage, which may be measured in units of the two or more time sections. The motor constant or constants may be a constant or constants representing the characteristic or characteristics of the motor. The motor constant or constants may be at least one of a resistance component of the motor, an inductance component of the motor, or a counter electromotive force constant of the motor.

The calculating of the motor constant(s) of the motor, in operation S30, as illustrated in FIG. 8, may include calculating the resistance component of the motor, based on an output of the motor current in the first section, in operation S31, calculating the inductance component of the motor, based on a change in the motor current in the second section, in operation S32, and calculating the counter electromotive force constant of the motor, based on a non-output of the motor current in the third section, in operation S32. Identifying the kind of motor may include comparing the predetermined criterion with at least one of the motor constant(s) which is calculated in operation S30, thereby identifying the kind of motor, in operation S40. The predetermined criterion may be a criterion for the motor constant(s), which may be differently set depending on the kind of motor. Controlling the linear compressor, in operation S50, may including generating a control signal for controlling the linear compressor depending on the kind of motor, which is identified in operation S40.

Applying the test signal, in operation S10, may including applying the test signal to the linear compressor before the linear compressor starts to normally operate, and controlling the linear compressor, in operation S50, may include generating the control signal for controlling the normal driving of the linear compressor. That is, the control method 1 may identify a model of the motor using the test signal before the linear compressor starts to normally operate, may generate the control signal depending on the identified kind of motor, and may control the linear compressor using the control signal, leading to control based on the model of the motor.

The control method 2 illustrated in FIG. 7 may be a control method for identifying the kind of motor of the linear compressor to diagnose whether the linear compressor has broken down. The control method 2, as illustrated in FIG. 7, may include applying a test signal to a linear compressor, in operation S10, measuring a motor current and a motor voltage based on the test signal, in operation S20, calculating a motor constant or constants of a motor, based on the measured motor current and motor voltage, in operation S30, and comparing a result of the calculation with a predetermined criterion to diagnose whether the linear compressor has broken down, based on a result of the comparison, in operation S45. The test signal may include different kinds of signals, which may be differently supplied in units of two or more time sections.

The test signal may be a test dedicated signal, which may be applied to the linear compressor for identifying the kind of motor of the linear compressor. The test signal may be one of a DC voltage or a high frequency voltage.

The two or more time sections may be divided into a first section, which starts immediately when the test signal is applied to the linear compressor, a second section, which is a transition section until before the test signal disappears after the test signal is applied to the linear compressor, and a third section subsequent to the second section. That is, as the test signal is applied as different signals in units of the two or more time sections, each of the motor current and the motor voltage may be differently output in the first section, the second section, and the third section.

The first section may be a section during which the motor current is output as a certain DC signal. The second section may be a transition section during which the motor current is changed from a certain DC current to 0 A. The third section may be a section during which the motor current is not output.

Calculating the motor constant or constants of the motor, in operation S30, may include calculating the motor constant or constants of the motor, based on the motor current and the motor voltage, which may be measured in units of the two or more time sections. The motor constant or constants may be a constant representing the characteristic or characteristics of the motor. The motor constant or constants may be at least one of a resistance component of the motor, an inductance component of the motor, or a counter electromotive force constant of the motor.

Calculating the motor constant(s) of the motor, in operation S30, may include, as illustrated in FIG. 8, calculating the resistance component of the motor, based on an output of the motor current in the first section, in operation S31, calculating the inductance component of the motor, based on a change in the motor current in the second section, in operation S32, and calculating the counter electromotive force constant of the motor, based on a non-output of the motor current in the third section, in operation S33.

Diagnosing whether the linear compressor has broken down may include comparing a pre-stored motor constant(s) with at least one motor constant(s), which is calculated in operation S30, thereby diagnosing whether the linear compressor has broken down, in operation S45.

The pre-stored motor constant(s) may be a motor constant or constants, which may be stored before the linear compressor starts to normally operate. The pre-stored motor constant(s) may be a motor constant or constants of an operating motor, which may be previously calculated, or may be a motor constant or constants, which may be input, set, and stored.

That is, the control method 2 may check whether a calculated motor constant(s) matches the pre-stored motor constant(s), thereby diagnosing whether an motor which is operating has broken down, when the calculation result matches the pre-stored motor constant(s), the linear compressor may be diagnosed as being normal, but when the calculation result does not match the pre-stored motor constant(s), the linear compressor may be diagnosed as being abnormal.

That is, when the motor does not normally operate due to an error that occurs in the motor, the characteristic or characteristics of the motor may be changed, and for this reason, the motor constant(s) may be calculated as a value that does not match the pre-stored motor constant(s). Therefore, when the calculated motor constant(s) does not match the pre-stored motor constant(s), the controller 40 may diagnose the motor as being abnormal. On the other hand, when the motor normally operate because an error does not occur in the motor, the characteristic or characteristics of the motor may not be changed, and thus, the motor constant(s) may be calculated as a value that matches the pre-stored motor constant(s). Therefore, when the calculated motor constant(s) matches the pre-stored motor constant(s), the controller 40 may diagnose the motor as being normal.

The apparatus for controlling a linear compressor and the method for controlling a linear compressor, according to embodiments, may be applied to an apparatus for controlling a compressor and a method for controlling a compressor. The apparatus for controlling a linear compressor and the method for controlling a linear compressor, according to embodiments, may be applied to a motor control apparatus and a motor control method. Also, the apparatus for controlling a linear compressor and the method for controlling a linear compressor, according to embodiments, may be applied to a fault diagnosis apparatus, a fault diagnosis method, a test apparatus, and a test method.

The apparatus for controlling a linear compressor and the method for controlling a linear compressor, according to embodiments, may be usefully applied to an apparatus for controlling a linear compressor and a method for controlling a linear compressor, which control various kinds of linear compressors. The apparatus for controlling a linear compressor and the method for controlling a linear compressor, according to embodiments, may identify a kind of motor, based on an output, which may be measured by applying a test signal to the linear compressor, and thus, the kind of motor may be autonomously identified without a separate device or a measurement operation. The apparatus for controlling a linear compressor and the method for controlling a linear compressor, according to embodiments, may control the linear compressor depending on the kind of motor, which may be autonomously identified, and thus, control suitable for a characteristic or characteristics of the motor may be accurately and efficiently controlled.

As the apparatus for controlling a linear compressor and the method for controlling a linear compressor, according to embodiments, control the linear compressor depending on the kind of motor, which may be autonomously identified, various kinds of linear compressors may be controlled using one control program. Further, the apparatus for controlling a linear compressor and the method for controlling a linear compressor, according to embodiments, control various kinds of linear compressors using one control program, a process of manufacturing an apparatus for controlling a linear compressor or a structure of a control program may be simplified.

Furthermore, the apparatus for controlling a linear compressor and the method for controlling a linear compressor, according to embodiments, identify a kind of motor based on an output, which may be measured by applying a test signal to the linear compressor, a breakdown of the linear compressor may be diagnosed based on a result of the identification. As the apparatus for controlling a linear compressor and the method for controlling a linear compressor, according to embodiments, diagnose the breakdown of the linear compressor, maintenance, repair, and inspection of the linear compressor may be simply and easily performed.

Embodiments disclosed herein provide an apparatus and method for controlling a linear compressor, which apply a test signal to the linear compressor to identify a kind of motor, control the linear compressor according to a result of the identification, and diagnose whether the linear compressor has broken down.

Embodiments disclosed herein provide an apparatus for controlling a linear compressor that may include a driver configured to drive a linear compressor, based on a control signal; a current detector configured to detect a motor current of the linear compressor; a voltage detector configured to detect a motor voltage of the linear compressor; and a controller configured to generate the control signal, based on the motor current and the motor voltage. The controller may apply a test signal to the linear compressor and identify a kind of motor, based on the motor current and the motor voltage, which may be measured, and the test signal may include different kinds of signals, which may be differently supplied in units of two or more time sections.

The test signal may be one of a direct current (DC) voltage or a high frequency voltage. The two or more time sections may include a first section immediately when the test signal is applied to the linear compressor, a second section which is a transition section until before the test signal disappears after the test signal is applied to the linear compressor, and a third section subsequent to the second section.

The first section may be a section where or during which the motor current is output as a certain direct current (DC) current, and the controller may calculate a resistance component of the motor, based on an output of the motor current in the first section. The second section may be a transition section where or during which the motor current is changed from a certain direct current (DC) current to 0 A, and the controller may calculate an inductance component of the motor, based on a change in the motor current in the second section. The third section may be a section where or during which the motor current is not output, and the controller may calculate a counter electromotive force constant of the motor, based on a non-output of the motor current in the third section.

The controller may calculate a motor constant or constants of the motor, based on the motor current and the motor voltage, which may be measured in units of the two or more time sections, and the motor constant or constants may include at least one of a resistance component of the motor, an inductance component of the motor, or a counter electromotive force constant of the motor. The controller may compare a result of the calculation with a predetermined criterion to identify a kind of the motor, and the predetermined criterion may be a criterion for the motor constant or constants, which may be differently set depending on the kind of the motor.

The controller may apply the test signal to the linear compressor before the linear compressor starts to normally operate, and may generate the control signal for normal driving, based on the identified kind of the motor.

The apparatus may further include a memory configured to store the motor constant or constants. The controller may apply the test signal to the linear compressor to calculate the motor constant or constants, may compare a result of the calculation with the motor constant or constants stored in the memory to determine whether the calculation result matches the stored motor constant or constants, and may diagnose whether the linear compressor has broken down, based on a result of the determination.

Embodiments disclosed herein further provide a method of controlling a linear compressor that may include applying a test signal to a linear compressor; measuring a motor current and a motor voltage based on the test signal; calculating a motor constant or constants of a motor, based on the measured motor current and motor voltage; comparing a result of the calculation with a predetermined criterion to identify a kind of a motor; and controlling the linear compressor depending on the identified kind of the motor. The test signal may include different kinds of signals, which may be differently supplied in units of two or more time sections.

The test signal may be one of a direct current (DC) voltage or a high frequency voltage. The two or more time sections may include a first section immediately when the test signal is applied to the linear compressor, a second section which is a transition section until before the test signal disappears after the test signal is applied to the linear compressor, and a third section subsequent to the second section. The first section may be a section where or during which the motor current is output as a certain direct current (DC) current, the second section may be a transition section where or during which the motor current is changed from a certain DC current to 0 A, and the third section may be a section where or during which the motor current is not output.

The calculating the motor constant of the motor may include calculating a motor constant or constants of the motor, based on the motor current and the motor voltage, which may be measured in units of the two or more time sections, and the motor constant or constants may include at least one of a resistance component of the motor, an inductance component of the motor, a counter electromotive force constant of the motor. The calculating the motor constant or constants of the motor may include calculating a resistance component of the motor, based on an output of the motor current in the first section. The calculating the motor constant or constants of the motor may include calculating an inductance component of the motor, based on a change in the motor current in the second section. The calculating the motor constant or constants of the motor may include calculating a counter electromotive force constant of the motor, based on a non-output of the motor current in the third section.

The predetermined criterion may be criterion for the motor constant or constants, which may be differently set depending on the kind of the motor. The applying of the test signal may include applying the test signal before the linear compressor starts to normally operate and controlling the linear compressor.

Embodiments disclosed herein further provide a method of controlling a linear compressor that may include applying a test signal to a linear compressor; measuring a motor current and a motor voltage based on the test signal; calculating a motor constant or constants of a motor, based on the measured motor current and motor voltage; and comparing a result of the calculation with a predetermined criterion to diagnose whether the linear compressor is broken down, based on a result of the comparison. The test signal may include different kinds of signals, which may be differently supplied in units of two or more time sections.

The test signal may be one of a direct current (DC) voltage or a high frequency voltage. The two or more time sections may include a first section immediately when the test signal is applied to the linear compressor, a second section which is a transition section until before the test signal disappears after the test signal is applied to the linear compressor, and a third section subsequent to the second section. The first section may be a section where or during which the motor current is output as a certain direct current (DC) current, the second section may be a transition section where or during which the motor current is changed from a certain DC current to 0 A, and the third section may be a section where or during which the motor current is not output.

The calculating the motor constant or constants of the motor may include calculating a motor constant or constants of the motor, based on the motor current and the motor voltage, which may be measured in units of the two or more time sections, and the motor constant or constants may include at least one of a resistance component of the motor, an inductance component of the motor, a counter electromotive force constant of the motor. The calculating the motor constant or constants of the motor may include calculating a resistance component of the motor, based on an output of the motor current in the first section. The calculating the motor constant or constants of the motor may include calculating an inductance component of the motor, based on a change in the motor current in the second section. The calculating the motor constant or constants of the motor may include calculating a counter electromotive force constant of the motor, based on a non-output of the motor current in the third section. The predetermined criterion may be criterion for the motor constant or constants, which may be differently set depending on the kind of the motor.

The diagnosing of whether the linear compressor has broken down may include, when the calculation result matches the pre-stored motor constant or constants, diagnosing the linear compressor as being normal, and when the calculation result does not match the pre-stored motor constant or constants, diagnosing the linear compressor may as being abnormal.

The apparatus for controlling a linear compressor and the method for controlling a linear compressor, according to embodiments, may identify a kind of motor, based on an output, which may be measured by applying a test signal to the linear compressor, and thus, the kind of motor may be autonomously identified without a separate device or a measurement operation. Further, the apparatus for controlling a linear compressor and the method for controlling a linear compressor, according to embodiments, may control the linear compressor depending on the kind of motor, which may be autonomously identified, and thus, control suitable for a characteristic or characteristics of the motor may be accurately and efficiently controlled.

As the apparatus for controlling a linear compressor and the method for controlling a linear compressor, according to embodiments, control the linear compressor depending on a kind of motor, which may be autonomously identified, various kinds of linear compressors may be controlled using one control program. Further, as the apparatus for controlling a linear compressor and the method for controlling a linear compressor, according to embodiments, control various kinds of linear compressors using one control program, a process of manufacturing an apparatus for controlling a linear compressor or a structure of a control program may be simplified.

Furthermore, as the apparatus for controlling a linear compressor and the method for controlling a linear compressor, according to embodiments, identify a kind of motor based on an output, which may be measured by applying the test signal to the linear compressor, a breakdown of the linear compressor may be diagnosed based on a result of the identification. As the apparatus for controlling a linear compressor and the method of controlling a linear compressor, according to embodiments, diagnose breakdown of the linear compressor, maintenance, repair, and inspection of the linear compressor may be simply and easily performed.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling a linear compressor, the apparatus comprising:
   a driver that drives a linear compressor including a motor, based on a control signal;
   a current detector that detects a motor current of the linear compressor;
   a voltage detector that detects a motor voltage of the linear compressor; and
   a controller that generates the control signal, based on the motor current and the motor voltage, wherein the controller applies a test signal to the linear compressor and identifies a kind of the motor, based on the motor current and the motor voltage, which are measured, wherein the test signal includes different kinds of signals, which are differently supplied in units of two or more time sections, and wherein the two or more time sections include a first section which starts when the test signal is applied to the linear compressor, a second section, which is a transition section until before the test signal disappears after the test signal is applied to the linear compressor, and a third section subsequent to the second section.

2. The apparatus of claim 1, wherein the test signal is one of a direct current (DC) voltage or a high frequency voltage.

3. The apparatus of claim 1, wherein the first section is a section during which the motor current is output as a certain direct current (DC) current, and wherein the controller calculates a resistance component of the motor, based on an output of the motor current in the first section.

4. The apparatus of claim 1, wherein the second section is a transition section during which the motor current is changed from a certain direct current (DC) current to 0 A, and wherein the controller calculates an inductance component of the motor, based on a change in the motor current in the second section.

5. The apparatus of claim 1, wherein the third section is a section during which the motor current is not output, and wherein the controller calculates a counter electromotive force constant of the motor, based on a non-output of the motor current in the third section.

6. The apparatus of claim 1, wherein the controller calculates at least one motor constant of the motor, based on the motor current and the motor voltage, which are measured in units of the two or more time sections, and wherein the at least one motor constant includes at least one of a resistance component of the motor, an inductance component of the motor, or a counter electromotive force constant of the motor.

7. The apparatus of claim 6, wherein the controller compares a result of the calculation with predetermined criterion to identify the kind of the motor, and wherein the predetermined criterion is criterion for the at least one motor constant, which is differently set depending on the kind of the motor.

8. The apparatus of claim 7, wherein the controller applies the test signal to the linear compressor before the linear compressor starts to normally operate, and generates the control signal for normal driving, based on the identified kind of the motor.

9. The apparatus of claim 7, further including:
a memory that stores at least one predetermined motor constant, wherein the controller applies the test signal to the linear compressor to calculate the at least one motor constant, compares a result of the calculation with the stored at least one predetermined motor constant to determine whether the calculation result matches the stored at least one predetermined motor constant, and diagnoses whether the linear compressor has broken down, based on a result of the determination.

10. A method of controlling a linear compressor, the method comprising:
driving a linear compressor including a motor, based on a control signal;
detecting a motor current of the linear compressor;
detecting a motor voltage of the linear compressor; and
generating the control signal, based on the motor current and the motor voltage, wherein the method further includes:
applying a test signal to the linear compressor; and
identifying a kind of the motor, based on the motor current and the motor voltage, which are measured, wherein the test signal includes different kinds of signals, which are differently supplied in units of two or more time sections, and wherein the two or more time sections include a first section, which starts immediately when the test signal is applied to the linear compressor, a second section, which is a transition section until before the test signal disappears after the test signal is applied to the linear compressor, and a third section subsequent to the second section, wherein the first section is a section during which the motor current is output as a certain direct current (DC) current, wherein the second section is a transition section during which the motor current is changed from a certain DC current to 0 A, and wherein the third section is a section during which the motor current is not output.

11. The method of claim 10, wherein the test signal is one of a direct current (DC) voltage or a high frequency voltage.

12. The method of claim 10, wherein the identifying of the kind of the motor includes calculating at least one motor constant of the motor, based on the motor current and the motor voltage, which are measured in units of the two or more time sections, and comparing a result of the calculation with predetermined criterion to identify the kind of the motor, wherein the at least one motor constant includes at least one of a resistance component of the motor, an inductance component of the motor, or a counter electromotive force constant of the motor, and wherein the predetermined criterion is criterion for the at least one motor constant, which is differently set depending on the kind of the motor.

13. The method of claim 12, wherein the identifying of the kind of the motor includes calculating a resistance component of the motor, based on an output of the motor current in the first section.

14. The method of claim 13, wherein the identifying of the kind of the motor includes calculating an inductance component of the motor, based on a change in the motor current in the second section.

15. The method of claim 14, wherein the identifying of the kind of the motor includes calculating a counter electromotive force constant of the motor, based on a non-output of the motor current in the third section.

16. The method of claim 12, wherein the generating of the control signal includes generating the control signal, based on a result of the identification.

17. The method of claim 12, further including:
determining whether the linear compressor has broken down, wherein the determining of whether the linear compressor has broken down includes determining whether the linear compressor has broken down, based on whether the calculation result matches at least one predetermined motor constant.

* * * * *